(12) United States Patent
Köhler et al.

(10) Patent No.: US 7,438,368 B2
(45) Date of Patent: Oct. 21, 2008

(54) ELECTRICAL BRAKING DEVICE FOR VEHICLE TRAILERS AND METHOD FOR OPERATION THEREOF

(75) Inventors: Robert Köhler, Walrenhausen (DE); Kurt Kober, Kleinkötz (DE)

(73) Assignee: Al-Kokober AG, Kötz (DE)

( * ) Notice: Subject to any disclaimer, the term of this patent is extended or adjusted under 35 U.S.C. 154(b) by 475 days.

(21) Appl. No.: 10/496,821

(22) PCT Filed: Nov. 27, 2002

(86) PCT No.: PCT/EP02/13349

§ 371 (c)(1),
(2), (4) Date: May 25, 2004

(87) PCT Pub. No.: WO03/045755

PCT Pub. Date: Jun. 5, 2003

(65) Prior Publication Data

US 2005/0006952 A1    Jan. 13, 2005

(30) Foreign Application Priority Data

Nov. 29, 2001    (DE)    ............................ 201 19 469 U (51) Int. Cl.
*B60T 7/20*    (2006.01)
*B60T 13/74*    (2006.01)

(52) U.S. Cl. .................. 303/123; 303/124; 188/1.11 E
(58) Field of Classification Search .................. 303/20, 303/123; 280/455.1; 188/112 R
See application file for complete search history.

(56) References Cited

U.S. PATENT DOCUMENTS

| 2,856,036 | A | * | 10/1958 | Mullen ................... 188/112 R |
| 3,897,979 | A |   | 8/1975  | Vangalis et al. |
| 3,972,543 | A | * | 8/1976  | Presley et al. ............. 280/455.1 |
| 3,981,542 | A |   | 9/1976  | Abrams et al. |
| 4,023,864 | A | * | 5/1977  | Lang et al. ..................... 303/20 |
| 5,226,675 | A | * | 7/1993  | Noah et al. ................. 280/439 |
| 6,053,521 | A | * | 4/2000  | Schertler .................... 280/511 |
| 6,280,004 | B1 | * | 8/2001 | Greaves, Jr. ................. 303/20 |
| 6,705,684 | B1 | * | 3/2004 | Garvey ....................... 303/123 |

FOREIGN PATENT DOCUMENTS

| DE | 2 024 406  | 12/1970 |
| DE | 35 24 932  | 1/1987  |
| DE | 100 46 130 | 4/2002  |
| GB | 1 301 826  | 1/1973  |
| WO | WO 01/14188 | 3/2001 |

* cited by examiner

*Primary Examiner*—Melody M Burch
(74) *Attorney, Agent, or Firm*—McGlew & Tuttle, P.C.

(57) ABSTRACT

A method for electric braking of a vehicle trailer and a device for vehicle trailers is provided. The vehicle trailer has a rigid hitch or drawbar arrangement (7) and is braked by the overrun forces generated as a result of braking of the tractor vehicle (2). The brake device (1) has a force measuring arrangement which can be mounted at the rigid hitch arrangement (7) and statically records the compression and tension forces acting axially on the hitch arrangement (7) using tensometer strips (24, 25) to determine the wheel brake force needed for braking via a controller that correspondingly actuates the electrical wheel brakes.

20 Claims, 6 Drawing Sheets

ELECTRICAL BRAKING DEVICE FOR VEHICLE TRAILERS AND METHOD FOR OPERATION THEREOF

FIELD OF THE INVENTION

The present invention pertains to an electric brake device for vehicle trailers with a rigid hitch arrangement and a trailer coupling, wherein the brake device has a power supply unit that can be connected to a towing vehicle and a sensing means as well as a control for determining the braking forces needed and to a process for actuating same.

BACKGROUND OF THE INVENTION

Such an electric brake device for vehicle trailers is known in the U.S.A. They comprise electric wheel brakes with a power supply that can be connected to the towing vehicle and a sensing means with a control for determining the necessary braking forces. The sensing means is designed as an inertia or pendulum measuring unit, which picks up the decelerations during braking and signals them to the control. The control itself actuates the electric wheel brakes via control lines. The wheel brakes comprise brake shoes or other brake elements, which are actuated and released by means of an electric actuating drive.

SUMMARY OF THE INVENTION

The object of the present invention is to provide a better electric braking technique for vehicle trailers.

This object is accomplished by the electric brake means according to the present invention for overridingly braked trailers having the advantage that it can determine the forces occurring during the braking and the repeated acceleration of the towing vehicle and the trailer better and more accurately than the prior-art pendulum or inertia measurement. The force-sensing device can also respond more rapidly, so that the brakes respond sooner and more accurately. The forces can be sensed in any desired and suitable manner directly or indirectly, e.g., based on strain. In the preferred embodiment, the force-sensing device comprises a plurality of electric strain gauges and can pick up the forces occurring without movement (i.e., without movement of the part with the sensor relative to other parts of the vehicle trailer/hitch arrangement). A preferably completely rigid hitch arrangement is also provided for this. The elimination of movable parts, such as pushing elements or the like in the hitch or sensing area, rules out distorting effects from the inertia of masses, frictional resistances, corrosion phenomena and the like. Rather, the axial tensile and compressive forces occurring directly in the hitch arrangement can be picked up directly with the electric wire strain gauges in the form of strains or stresses, which offers maximum accuracy of sensing.

Furthermore, the low wear and the economy offered by the low manufacturing and maintenance costs are advantageous.

To increase the accuracy of sensing, it is recommended that the wire strain gauges be arranged at a rigid pipe section with massive wall. They are arranged at two opposite long sides and are preferably located in the area of the neutral axis of the pipe section, in which the neutral elastic line with reference to vertical forces extends. Effects of bending stresses can thus be extensively eliminated during the sensing. The massive and perforation-free wall likewise has a favorable effect on the sensing results.

The pipe section is rigidly connected at its front end with the trailer coupling and is preferably made in one piece with the coupling housing. At the other end, the pipe section is rigidly connected with the hitch arrangement. A clamped or screw connection in this area has the advantage that it is also permanently rigid in case of alternating loads and, moreover, does not have any interfering effects on the force sensing. It is also favorable for this purpose if the wire strain gauges are arranged approximately in the axial middle between the front coupling housing and the rearward fastening point and are located at a sufficient distance from the fastening points.

The control is preferably designed as a highly integrated and compact control, which can be accommodated in the interior of the pipe section in a space-saving and protected manner. The line connections between the electric wire strain gauges and the control can also kept short as a result. The front connection cable for the power supply and the rear control lines to the electric wheel brakes can also be accommodated and installed in a protected manner through the pipe section. For the same reason, the control lines may also be led farther up to the wheel brakes in the interior space of the crossties of the chassis.

The power supply and the connection cable can be connected to the trailer socket of the towing vehicle. They are supplied with energy for the operation of the control, the force-sensing device and the electric wheel brake via the permanent plus contact. In addition, it is possible to switch the trailer brake function on and off as a function of the actuation of the brake pedal in the towing vehicle via the connection at the brake light contact of the towing vehicle. Moreover, pre-braking can be achieved, in which case the trailer brakes are already actuated during a slight actuation of the brake pedal in the towing vehicle on the basis of a corresponding preset value from the control before an overriding force of the trailer can be sensed at the force-sensing device. In addition, rolling or swerving of the trailer as well as rocking can be reduced by this prebraking, which can preferably be set to the particular trailer weight.

The electric brake means can be integrated in new vehicle trailers as original equipment and can also form a mounting unit with these. The present invention therefore also covers vehicle trailers with an integrated electric brake means. Furthermore, the present invention shows a brake head that is designed as an add-on piece for any desired hitch arrangement and makes possible the upgrading or conversion of existing electric brake means or other brake means. While the electric wheel brakes and the control lines continue to be used, the pendulum measuring units and the control of the prior-art American design are replaced with the brake head. In addition, the brake head can be shipped as an autarchic mounting unit, which is optionally complemented with electric wheel brakes, to vehicle trailer manufacturers and combined with any desired chassis there. Precalibration is recommended in order to further simplify the installation.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
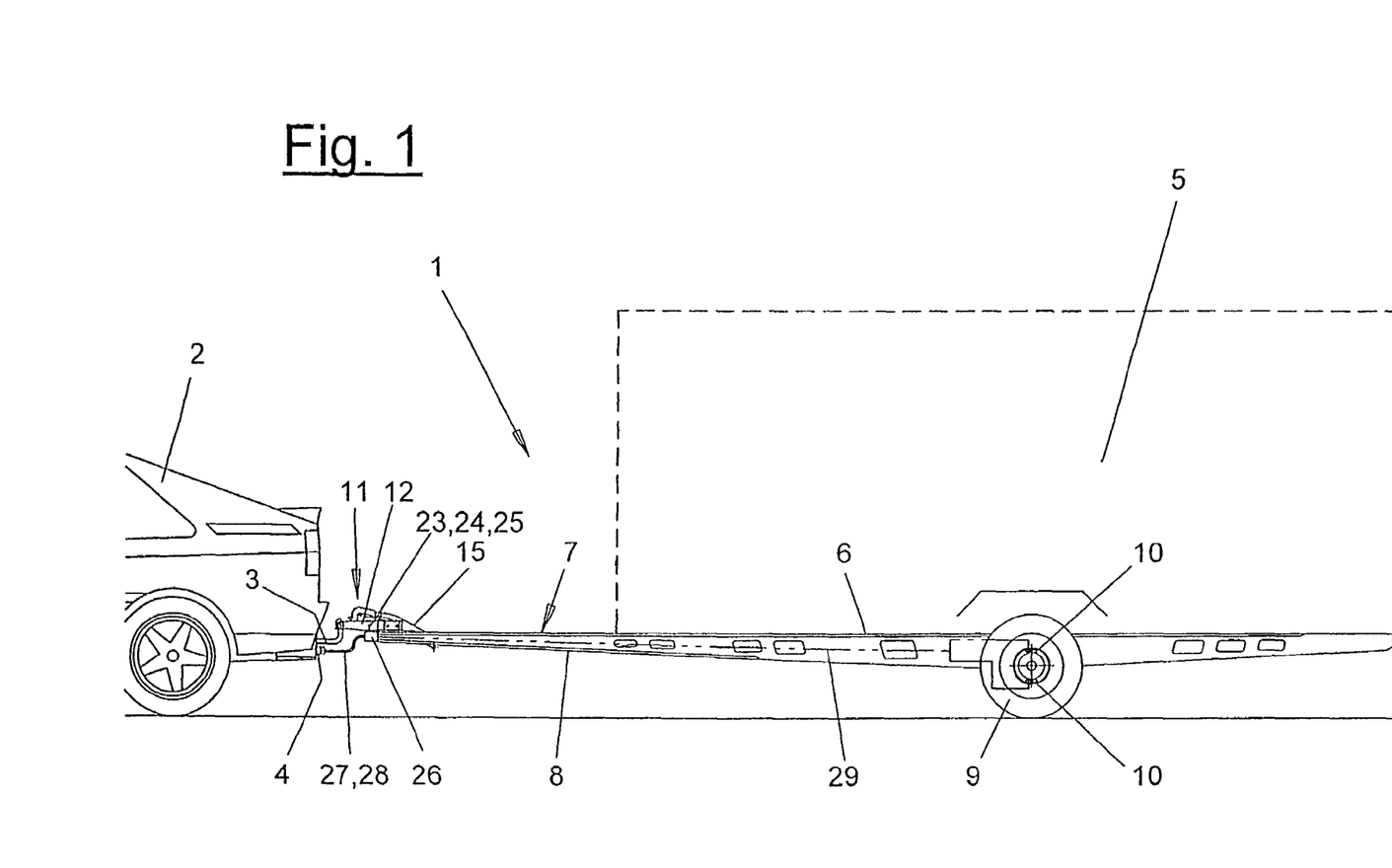
FIG. 1 is a cut-away side view of a unit comprising a towing vehicle and the vehicle trailer with an electric brake means for the trailer.

Referring to the drawings in particular, FIG. 1 shows in a cut-away side view a towing vehicle 2 and a coupled vehicle trailer 5, which is braked as a function of the overriding forces. The towing vehicle 2 is preferably a passenger car or a light truck and has a suitable towing means, e.g., a tow hook or so-called ball neck 3, which has a coupling ball at its end. In addition, an electric multipole socket 4, at which a power line with permanent plus, a brake light signal for the brake actuation of the towing vehicle 2 and other voltages and signal currents necessary for the lighting of the trailer are made available via various contacts, is arranged at the towing vehicle 2 in the rear area.

The vehicle trailer 5 has a chassis 6 of any desired design, which is equipped with a rigid hitch arrangement 7. The chassis 6 carries a body of any desired design and has one or more axles with wheels 9. In the embodiment being shown, the hitch arrangement 7 comprises a V-tow hitch with two hitch crossties 8, which converge in the forward direction at an acute angle and are connected to one another. They may pass over in one piece into the side rails of the chassis 6 or be rigidly connected with same. As an alternative, another hitch form, e.g., a single-tube hitch with a corresponding connection to the chassis 6, may be present as well. Furthermore, the hitch arrangement 7 may contain a trailer coupling 12.

The vehicle trailer 5 has an electric brake means 1, which is supplied by the towing vehicle 2 with electricity and via a connection cable 28 and a power supply unit 27. The electric brake means 1 comprises at each wheel 9 one or more electric wheel brakes 10, which may be of any desired and suitable design. For example, they may be drum brakes, disk brakes or any other desired and suitable brake system, which are equipped with any desired and suitable electric adjusting means. The adjusting means may comprise, e.g., electromagnets with spring-loaded adjusting levers, electric spindle motors or any other desired electric, electromagnetic, etc., actuator.

The electric wheel brakes 10 are connected via a control line 29 each with a control 26 of the electric brake means 1 and with the power supply unit 27.

The hitch ties 8 carry at their front end the trailer coupling 12, which is rigidly connected with the ties. The trailer coupling 12 has a coupling housing 13 with a coupling mechanism 14, which cooperate, e.g., with the ball head of the tow hook 3. In addition, a hand brake means 15 may be present in the area of the trailer coupling 12. This hand brake means 15 may be equipped as a purely mechanical auxiliary brake with a cable and with brake shoes at the wheel brakes, which brake shoes can be actuated mechanically. As an alternative, it may also be connected to the electric brake means 1, in which case operation is also possible by means of batteries, self-locking means or the like in the uncoupled state and without power supply from the towing vehicle 2.

The electric brake means 1 is actuated by the overriding forces occurring at the vehicle trailer 5 during the braking of the towing vehicle 2 due to inertia. To determine the overriding forces or braking forces and to correspondingly actuate the electric wheel brakes 10, it has a force-sensing device 23, which may be mounted at the rigid hitch arrangement 7 preferably on the outside but alternatively or additionally also on the inside and which picks up the axial tensile and compressive forces acting in the hitch arrangement 7, preferably without movement (i.e., without movement of the hitch arrangement relative to the trailer coupling), as compression or strains.

In the exemplary embodiment being shown, the force-sensing device 23 has a plurality of electric wire strain gauges 24, 25, which are arranged at both longitudinally extending side walls of a rigid member section or pipe section 16. The pipe section 16 is rigid and has a thin wall. The pipe wall is massive preferably in the area of the sensing device to avoid interfering effects, i.e., it has no perforations, weakened areas or the like.

Figure 2:
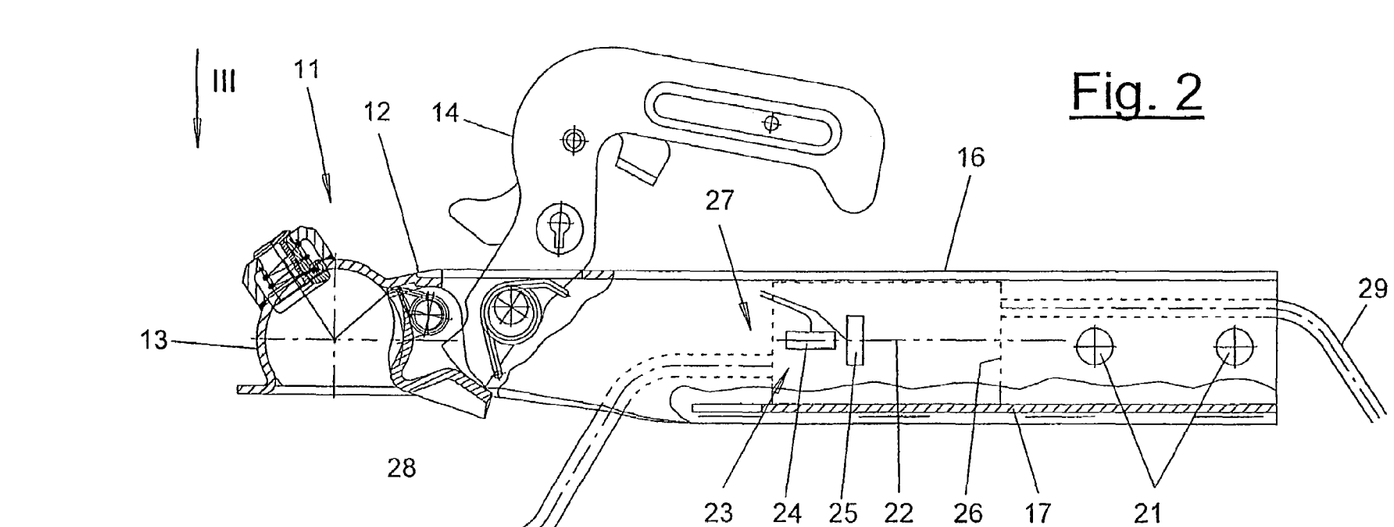
FIG. 2 is a partially cut-away side view of a break head with a trailer coupling and a pipe section made in one piece with integrated control and with a force-sensing device.
Figure 3:
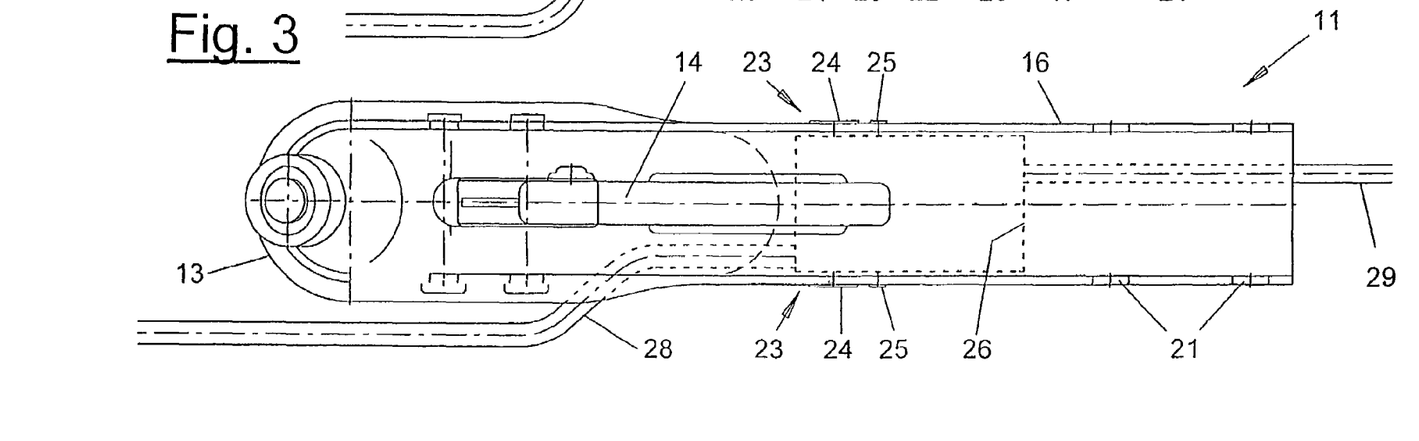
FIG. 3 is a top view of the brake head according to arrow III in FIG. 2.

As is illustrated in FIG. 2, two electric wire strain gauges 24, 25 each are arranged in the longitudinal and transverse orientations at the pipe section on the outside preferably on both sides at diametrically opposite sites. The wire strain gauges 24, 25 are located here in the area of the neutral axis 22 of the pipe section 16. This is the area of the neutral elastic line under the action of vertical forces on the hitch arrangement 7 or the pipe section 16 and is also called the neutral axis. Bending stresses are avoided in this neutral axis 22 at least extensively, so that the wire strain gauges 24, 25 sense above all the axial tensile and compressive forces in the pipe section 16 that occur at the site of application and are directed along the axis of the pipe directly via strains and compression. The sensed tensile and compressive forces are directed along the central longitudinal axis of the trailer with the pipe section 16 arranged centrally.

In case of the alternative arrangement of the wire strain gauges 24, 25 at another site of the rigid hitch arrangement 7, e.g., at the hitch ties, the axial tensile and compressive forces occurring there, which are directed along the ties, are determined. The vertical transverse forces can also be sensed or detected, if desired, in all embodiments.

The wire strain gauges 24, 25 are connected, e.g., in a Wheatstone bridge circuit and temperature compensated. Transverse and supporting forces or other undesired effects can also be compensated by a suitable orientation of the strain gauges and a corresponding bridge circuit. The wire strain gauges 24, 25 and their bridge circuits are connected with the control 26 by lines indicated in FIG. 2.

The preferably straight pipe section 16 is rigidly connected to the trailer coupling 12 at the front end. In the preferred embodiment, the pipe section 16 is made in one piece with the downwardly open coupling housing 13 of the trailer coupling 12. For example, the coupling housing 13, which has a U-shaped cross section, is extended in the rearward direction, forming the pipe section 16, and a bottom part 17 is inserted at a spaced location behind the coupling mechanism 14 and fastened by welding or the like to form the closed pipe wall. The bottom part 17 may have a rounded opening at the front edge. The trailer coupling 12 and the pipe section 16 preferably consist of metal and may be made from steel plate as stamped and bent parts or as a casting.

At the rearward end, the pipe section 16 is rigidly connected with the hitch ties 8 by means of a fastening means 19. There is a continuously rigid connection between the trailer coupling 12 and the hitch ties 8 and the entire chassis 6 via the pipe section 16 and the fastening means 19.

Figures 4, 5:
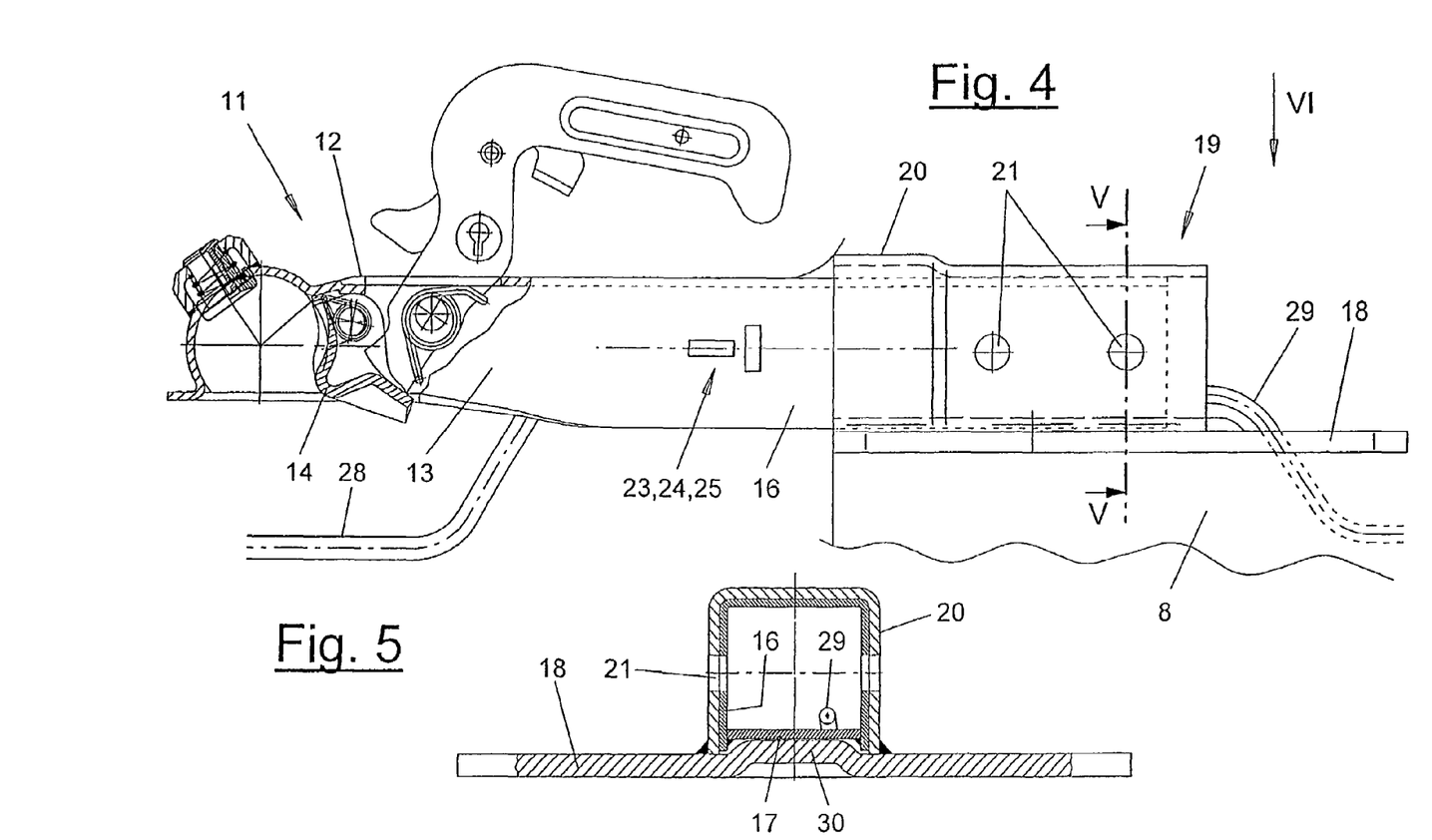
FIG. 4 is a cut-away side view of a completion of the brake with metal mounting fittings and a fastening means for connection with a hitch arrangement of the vehicle trailer.
FIG. 5 is a cross section through the brake head according to section line V-V in FIG. 4.

The fastening means 19 has a clamp and screw connection 21. This comprises a clamping part 20, which surrounds the pipe section 16 in the rear area on the outside and is fastened on the bottom side to a preferably metallic mounting fitting 18, e.g., a hitch plate, by welding or the like. The clamping plate 20 consists of metal and has a downwardly open hoop-shaped U-shaped cross section. The clamping part 20 is widened in a funnel-shaped pattern in the front area, as a result of which, e.g., a covered and protected mounting space can be formed for the wire strain gauges 24, 25.

Due to this shaping, the clamping part 20 forms a mounting pipe with the mounting fitting 18 for tightly surrounding the rearward end of the pipe section 16 and for forming a clamped connection with it. The side walls of the pipe section 16 and of the clamping part 20 have flush through holes in this clamped area for the screw connections, which preferably extend at right angles, or for other suitable positive-locking connections, e.g., rivets or the like. The through holes are likewise located preferably in the area of the neutral axis 22.

The force-sensing device 23, especially in the form of the electric wire strain gauges 24, 25, is positioned at the hitch arrangement 7 in the longitudinal direction at a suitable site, where possibly all the overriding forces and retaining forces caused by differences in velocity between the towing vehicle 2 and the vehicle trailer 5 and especially by the inertia of masses of the vehicle trailer 5 can be preferably sensed directly or indirectly. This application site is preferably located between the coupling point of the trailer coupling 12 at the tow hook 3 and the center of gravity of the vehicle trailer 5, especially between the coupling point and the closest fastening site of the trailer body at the chassis 6, in order to make it possible to detect the largest possible percentage of the forces of gravity.

The wire strain gauges 24, 25 are arranged in the exemplary embodiment being shown axially preferably in the middle area between the trailer coupling 12 and the coupling mechanism 14 of the said trailer coupling and the clamping part 20 at the pipe section 16. They are arranged, e.g., at the level or at a spaced location behind the front edge of the bottom part 17. As a result, they are relieved from interfering effects of the screw connections 21 and the trailer coupling 12.

Figure 6:
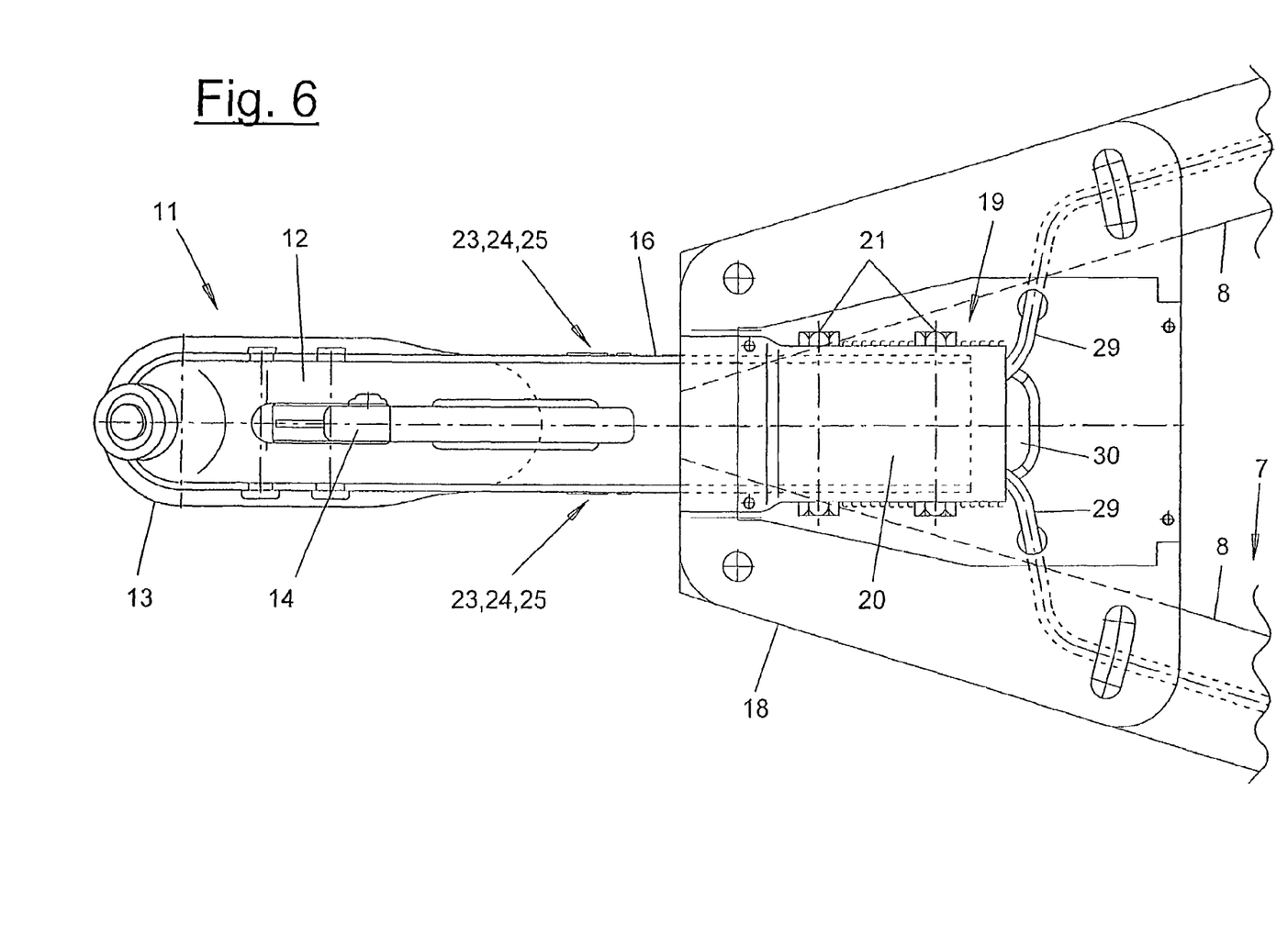
FIG. 6 is a top view of the brake head according to arrow VI in FIG. 4.
Figure 7:
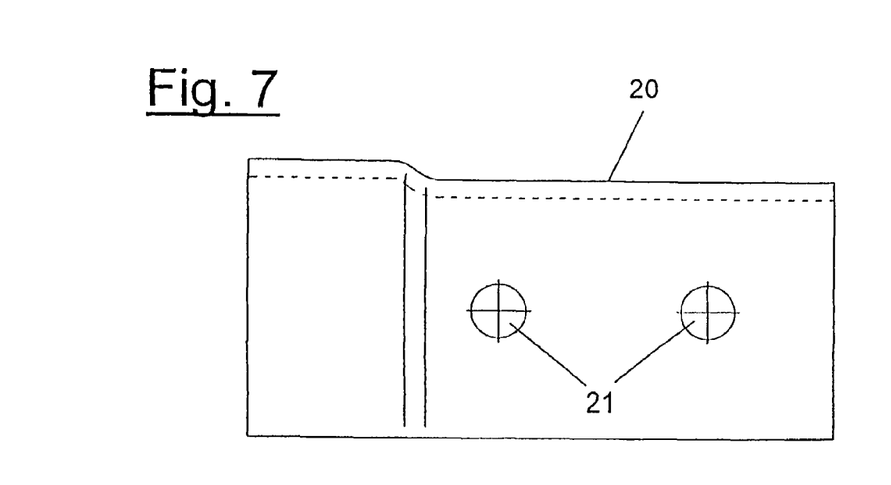
FIG. 7 is a side view of a clamping part of the brake head.
Figure 8:
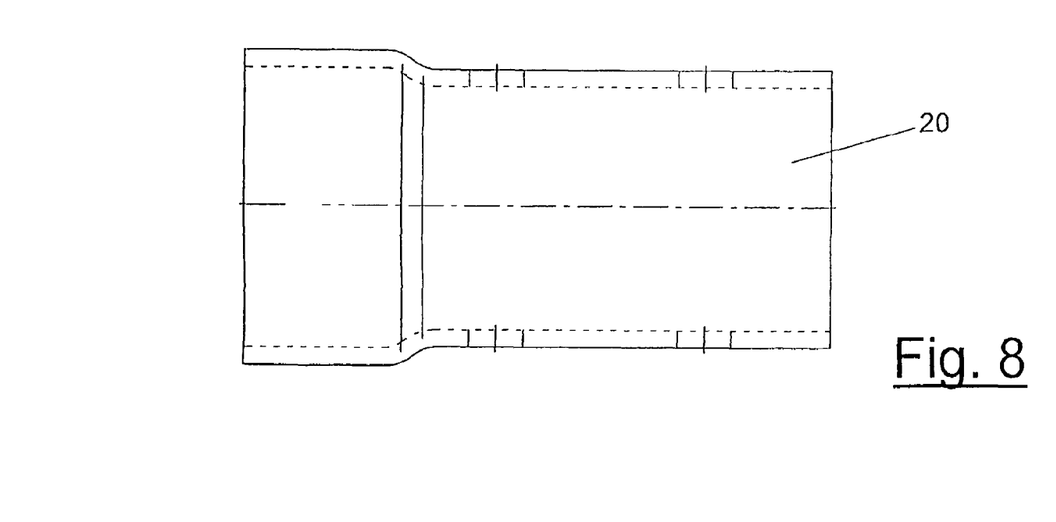
FIG. 8 is a top view of the clamping part of the brake head.
Figure 9:
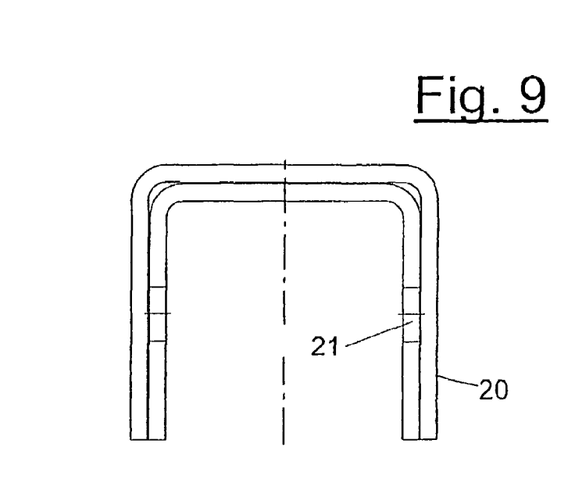
FIG. 9 is a front view of a clamping part of the brake head.

The mounting fitting 18 and the hitch plate can be connected with the hitch ties 8 by screws or the like. The hitch plate 18 preferably lies on the surface of the bent upper chords of the hitch ties 8, which said upper chords have a C-shaped cross section, and are screwed together there. The hitch plate 18 has a shape adapted to the shape of the hitch. In addition, the hitch plate 18 may have an upright hump 30 in the area of the clamping part 20, the said hump offering a lateral guiding for the pipe section 16 and also for the clamping piece 20 during the fastening.

The pipe section 16 and the clamping part 20 may have any desired and suitable cross section. Both have an essentially rectangular cross section in the exemplary embodiment according to FIGS. 1 through 9. The side walls of the pipe section 16 and the inserted bottom part 17 project somewhat downwardly here and are guided at the lateral flanks of the hump 30 there.

Figure 10:
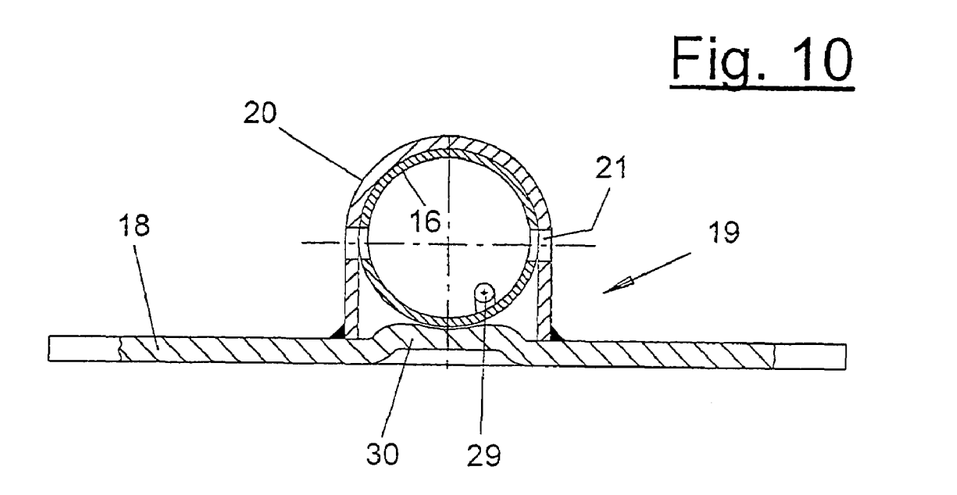
FIG. 10 is a cross section of a geometry variant of the pipe section and the fastening means.
Figure 11:
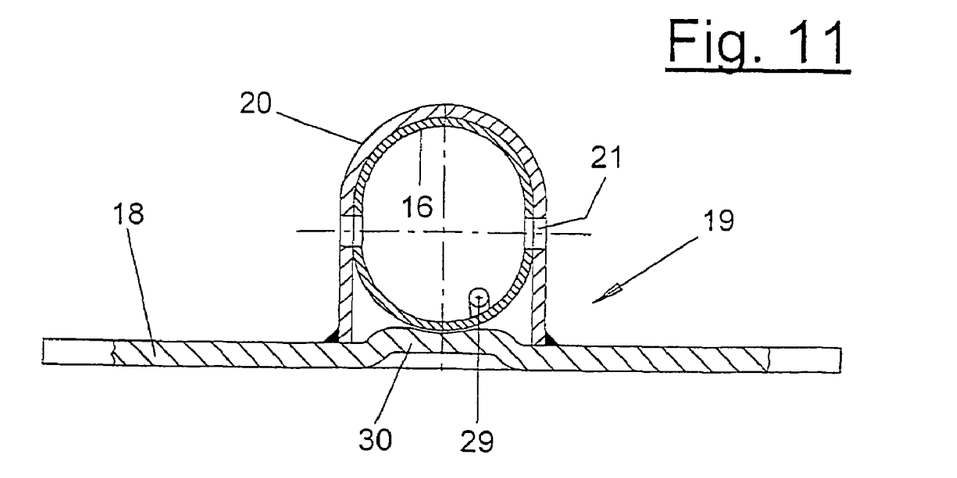
FIG. 11 is a cross section of a another geometry variant of the pipe section and the fastening means.

FIGS. 10 and 11 show a variant of this, where the pipe section 16 is designed in FIG. 10 as a cylindrical pipe with a round cross section. The clamping part 20 is designed as a rounded hoop, which has an arch tightly surrounding the pipe section 16 in the upper area and vertical walls adjoining in the lower area. The hump 30 may have centrally a longitudinal groove for guiding the round pipe section 16. The through holes or the screw connection 21 are located at least partially in the rounding area.

A pipe section 16 of oval cross section with a correspondingly adapted clamping part 20 is shown in the variant according to FIG. 11. In the middle area, the oval pipe section 16 has straight, vertical wall sections, in which the through holes or screw connections 21 are arranged. The pipe section 16 may otherwise also have an elliptical cross section, a prismatic shape or any other desired shape.

The control 26 is designed as a highly integrated control, which operates with the existing supply voltage of the vehicle 2, e.g., 12, 24 or 42 V, optionally such that it can be switched over. For reasons of fail-safe operation, the control 26 may also have an integrated energy storage means, e.g., a battery, with which temporary failures in the power supply can be bridged over. The control 26 may also have a monitoring circuit for controlling the power supply and for feeding back possible states of disturbance to the towing vehicle 2. The control 26 may be arranged at any desired site of the vehicle trailer 5. The control 26 preferably has such a compact design that it can be accommodated in the interior space of the pipe section 16 or in the hitch tie 8.

The control 26 can be connected to the socket 4 of the towing vehicle 2 via the connection cable 28. The connection cable 28 may be designed as a combination cable and also contain the lines not shown necessary for the lighting of the trailer, which are optionally connected to the control 26 and are led farther from this to the lighting means of the vehicle trailer 5, e.g., brake light, fog lights, back light, license plate light, flasher, additional contour lights, etc. For purposes of the electric brake means 1, the control 26 is connected via a line with the permanent plus pole and with the brake light pole of the socket 4 of the towing vehicle 2.

As a freely programmable as well as computer-aided control, the control 26 is equipped with one or more microprocessors, data storage units as well as I/O interfaces. It contains a comparison and evaluation circuit and a control circuit for actuating the electric wheel brakes 10. The force signals coming from the connected electric wire strain gauges 24, 25 are evaluated in the control 26 and converted into a control signal for actuating the electric wheel brakes 10.

The control function is switched on and off via the brake light signal of the towing vehicle 2. Prebraking of the vehicle trailer 5 may also be performed on the basis of a signal comparison. The brake light signal of the towing vehicle 2 responds already upon a slight actuation of the brake pedal and switches on the control 26. No significant deceleration and especially no overriding of the vehicle trailer 5 and no significant compressive force acting on the wire strain gauges 24, 25 can be sensed as yet during this slight braking, or the signals obtained by the force sensing are below a presettable switch-on threshold. Based on a stored program in the control 26, the electric wheel brakes 10 are already actuated in this case with a force that can be set in the way of a prebraking, so that the vehicle trailer 5 is braked before the towing vehicle 2 and the unit comprising the towing vehicle and the trailer stops while pulling. The prebraking reduces swerving and rocking effects of the vehicle trailer 5.

As soon as the force signals from the wire strain gauges 24, 25 are in the compression range and exceed a presettable threshold, the braking mode is switched over to the normal mode, and the electric vehicle brakes 10 are actuated corresponding to a preset program as a function of the sensed force signals, and the force of the brakes is controlled and regulated. As soon as the sensed force signals again drop below the said threshold or change over into the tension range, the braking action can be eliminated via the control 26. The same happens as soon the driver of the vehicle removes his foot from the brake pedal and the brake light signal goes out. The control 26 can still have a certain integrated hold time in this case and release the electric wheel brake 10 with a delay.

FIGS. 2 through 6 illustrate the design of a brake head 11 that can be used as an add-on piece as an original equipment and for upgrading chassis 6 or vehicle trailers 5 and optionally also for converting existing electric brake means 1. The brake head 11 comprises the trailer coupling 12 with the connected pipe section 16 as well as the fastening means 19 and the integrated control 26. The control 26 is preferably accommodated in this case in the interior of the pipe section 16 and approximately at the level of the wire strain gauges 24, 25. The entire brake head 11 may be attached to the towing hitch 7 completely with the hitch plate 18 and rigidly connected to same by means of screws or the like.

The connection cable 28 of the power supply unit 27 is already connected with the control 26 and is already led out through the front open end of the pipe section 16 and downward through the free opening of the coupling housing 13. The control lines 29 that may optionally already be present may be attached on the rear side of the control 26. They may protrude on the rear side from the open end of the pipe section 16 and of the clamping part 20. A corresponding protective cover may be optionally present here. The control lines 29 may be led downward and to the hitch ties 8 through holes in the hitch plate 18, and they are then led in the hitch ties rearwardly to the electric wheel brakes 10. The supply lines for the vehicle lighting not shown may also be connected on the rear side of the control 26. As an alternative, the control lines and supply lines may be led out downwardly in the pipe section 16 or the clamping part 20 and into the hitch ties 8.

The brake head 11 with its force-sensing device 23 and its control 26 may be precalibrated. As a result, the trailer manufacturer can attach the brake head and does not need to perform his own calibration. If necessary, he may still make a setting or selection for the actual permissible trailer weight on the control 26 if the brake head 11 can be used for different weights and there are correspondingly different calibrations.

Various variants of the embodiment being shown are possible. On the one hand, the electric brake means 1 and especially the brake head 11 may also be connected with another towing hitch 7, e.g., a single-pipe hitch. For example, the clamping part 20 may be directly connected here with the front end of the single-pipe hitch. It is also possible to use another, correspondingly suitable mounting fitting 18. Adaptations and fastening to rigid hitches of any other desired shapes are also possible due to a corresponding design of the fittings.

In another variant, pairs of wire strain gauges may be arranged at the pipe section 16 also on the upper side and the underside as an alternative or in addition. If the strain gauges are arranged correspondingly, it is thus also possible to pick up transverse movements of the chassis 6 in relation to the towing vehicle 2. In another variant, the wire strain gauges 24, 25 may also be arranged directly at the hitch ties 8 or crossties or at another side of the rigid hitch arrangement 7 or of the chassis 6, and the hitch ties 8 are in turn connected at the front end rigidly to the trailer coupling 12. Connections resistant to alternating loads, such as weld seams or the like, are advantageous in this case.

While specific embodiments of the invention have been shown and described in detail to illustrate the application of the principles of the invention, it will be understood that the invention may be embodied otherwise without departing from such principles.

The invention claimed is:

1. An electric brake device for vehicle trailers with a trailer travel direction and with a rigid hitch arrangement with a rigid member section extending in a rigid member section axial direction to a trailer coupling, the rigid member section axial direction being generally in the trailer travel direction, the device comprising:
    a brake means having a power supply unit that can be connected to a towing vehicle;
    a sensing means designed as a deformation-sensing device, mounted at the rigid hitch arrangement on the rigid member section for detecting deformation in the rigid member section and for determining the axial direction tensile and compressive forces acting in the rigid member section of the hitch arrangement in the rigid member section axial direction along the rigid section without movement of the hitch arrangement relative to the trailer coupling; and
    a control for determining the braking force needed based on the detected axial direction tensile and compressive forces and braking the trailer with the braking forces needed with the braking means.

2. A brake device in accordance with claim 1, wherein the deformation-sensing device has a plurality of electric wire strain gauges.

3. A brake device in accordance with claim 2, wherein the wire strain gauges are arranged on both sides at the rigid member section having massive walls.

4. A brake device in accordance with claim 2, wherein the wire strain gauges are arranged in an area of a neutral axis of the member section.

5. A brake device in accordance with claim 1, wherein the rigid member section is a straight member section rigidly connected with the trailer coupling.

6. A brake device in accordance with claim 5, wherein the member section is made in one piece with a coupling housing of the trailer coupling.

7. A brake device in accordance with claim 1, wherein the member section is rigidly connected with the hitch arrangement by means of a fastening means with a clamp and screw connection.

8. A brake device in accordance with claim 1, wherein the member section is fastened to a mounting fitting with a hitch plate, with a clamping part surrounding the member section on the outside.

9. A brake device in accordance with claim 8, wherein the deformation sensing device comprises a plurality of strain gauges and the wire strain gauges are arranged at the member section axially in the middle area between the trailer coupling and the clamping part.

10. A brake device in accordance with claim 1, wherein a mounting fitting has an axial hump for guiding the member section.

11. A brake device in accordance with claim 1, wherein a mounting fitting is rigidly connected with the front end of one or more hitch ties.

12. A brake device in accordance with claim 1, wherein the control is arranged in the member section.

13. A brake device in accordance with claim 12, wherein the vehicle trailers comprise a chassis with crossties and the brake means comprises electric wheel brakes and electric control lines are installed to the electric wheel brakes in the crossties of the chassis.

14. A brake device in accordance with claim 1, further comprising the power supply unit of the electric brake means has a connection cable with contacts for connection with lines for brake light and permanent plus of the towing vehicle.

15. An electric brake device, in accordance with claim 11, wherein a brake head designed as an add-on piece for the hitch arrangement includes the trailer coupling with the member section, the wire strain gauges, the control, the power supply unit and the mounting fitting.

16. A process for actuating an electric brake device of a vehicle trailer, which is equipped with a rigid hitch arrangement and a trailer coupling, wherein the brake device has a power supply unit, which can be connected to a towing vehicle, said electric wheel brakes and a sensing means as well as a control for determining and introducing the necessary braking forces, the process comprising the steps of:
- providing the rigid hitch arrangement with a rigid member extending to the trailer coupling in a travel force transmission direction that is along the rigid member between said rigid connection with the trailer coupling and the wheels;
- providing wire strain gauges mounted at the rigid member; and
- sensing deformation at the vehicle trailer during the braking of the towing vehicle at the rigid member of the rigid hitch arrangement to determine axial tensile and compressive forces acting in the rigid member of the hitch arrangement in the travel force transmission direction, without movement of the hitch arrangement relative to the trailer coupling based on the force transmission direction compressions or strains in the rigid member by means of said wire strain gauges;
- using a control to determine the braking force needed based on the detected axial tensile and compressive forces; and
- braking the trailer with the braking device based on the determined braking forces needed.

17. A vehicle trailer brake system, comprising:
- a trailer with a trailer coupling, a rigid member section extending between a rigid connection with the trailer coupling and wheels connected to the rigid member section and having a rigid member axial direction along a path of said rigid member between said rigid connection with the trailer coupling and the wheels;
- electric wheel brakes acting on the wheels for braking the trailer, the brakes having a power supply unit with means for connection to a power source of a towing vehicle;
- a deformation-sensing device mounted at the rigid member section to determine the rigid member axial direction tensile and compressive forces acting in the rigid member section in the rigid member axial direction, without movement of the rigid member section relative to the trailer coupling; and
- a control for determining a braking force needed based on the detected axial tensile and compressive forces sensed and braking the trailer with the braking forces needed with the electric wheel brakes.

18. A brake device in accordance with claim 17, wherein the deformation-sensing device comprises a plurality of electric wire strain gauges on the rigid member section.

19. A brake device in accordance with claim 18, wherein the wire strain gauges are arranged on both sides at the rigid member section having massive walls and the wire strain gauges are arranged in the area of a neutral axis of the rigid member section.

20. A brake device in accordance with claim 19, wherein the rigid member section is a straight member section rigidly connected with the trailer coupling.

* * * * *